United States Patent
Taniguchi et al.

(10) Patent No.: US 11,174,381 B2
(45) Date of Patent: Nov. 16, 2021

(54) RESIN COMPOSITION FOR MOLDING

(71) Applicants: SEKISUI CHEMICAL CO., LTD., Osaka (JP); TOKUYAMA SEKISUI CO., LTD., Osaka (JP)

(72) Inventors: Hiroshi Taniguchi, Yamaguchi (JP); Hiroaki Mochizuki, Yamaguchi (JP)

(73) Assignees: SEKISUI CHEMICAL CO., LTD., Osaka (JP); TOKUYAMA SEKISUI CO., LTD., Osaka (JP)

(*) Notice: Subject to any disclaimer, the term of this patent is extended or adjusted under 35 U.S.C. 154(b) by 7 days.

(21) Appl. No.: 16/636,694

(22) PCT Filed: Sep. 26, 2018

(86) PCT No.: PCT/JP2018/035705
§ 371 (c)(1),
(2) Date: Feb. 5, 2020

(87) PCT Pub. No.: WO2019/065739
PCT Pub. Date: Apr. 4, 2019

(65) Prior Publication Data
US 2020/0165433 A1 May 28, 2020

(30) Foreign Application Priority Data

Sep. 27, 2017 (JP) .............................. JP2017-187165
Mar. 26, 2018 (JP) .............................. JP2018-058481

(51) Int. Cl.
*C08L 27/06* (2006.01)
*B29C 45/00* (2006.01)
*C08K 5/098* (2006.01)
*C08L 25/10* (2006.01)
*C08L 27/24* (2006.01)
*C08L 33/12* (2006.01)
*C08L 55/02* (2006.01)

(52) U.S. Cl.
CPC .......... *C08L 27/06* (2013.01); *B29C 45/0001* (2013.01); *C08K 5/098* (2013.01); *C08L 25/10* (2013.01); *C08L 27/24* (2013.01); *C08L 33/12* (2013.01); *C08L 55/02* (2013.01); *C08L 2201/08* (2013.01); *C08L 2203/18* (2013.01)

(58) Field of Classification Search
USPC .................... 525/102, 104, 233, 235, 239
See application file for complete search history.

(56) References Cited

U.S. PATENT DOCUMENTS

| | | |
|---|---|---|
| 2016/0200893 A1 | 7/2016 | Matsumura et al. |
| 2016/0208072 A1 | 7/2016 | Matsumura et al. |
| 2017/0183491 A1 | 6/2017 | Matsumura et al. |
| 2017/0253716 A1 | 9/2017 | Shimamoto et al. |

FOREIGN PATENT DOCUMENTS

| | | | | |
|---|---|---|---|---|
| CN | 1970616 | 5/2007 | | |
| CN | 101880429 | 11/2010 | | |
| JP | 03-120275 | 5/1991 | | |
| JP | 03-134045 | 6/1991 | | |
| JP | 04-359928 | 12/1992 | | |
| JP | 05-132603 | 5/1993 | | |
| JP | 08-12833 | 1/1996 | | |
| JP | 2002-254576 | 9/2002 | | |
| JP | 2003-097768 | 4/2003 | | |
| JP | 2014-224176 | 12/2014 | | |
| TW | I227243 | 2/2005 | | |
| TW | 201333054 | 8/2013 | | |
| WO | 2009/058768 | 5/2009 | | |
| WO | 2015/046454 | 4/2015 | | |
| WO | 2015/046456 | 4/2015 | | |
| WO | WO2015046454 | * | 4/2015 | ............... C08K 3/22 |
| WO | 2016/013638 | 1/2016 | | |
| WO | 2016/031905 | 3/2016 | | |

OTHER PUBLICATIONS

WO2015046454A1 Translation; Yamasugi Ryota et al.; Molding Resin Composition Including Chlorinated Vinyl Chloride-Based Resin, and Molded Article Thereof (Year: 2015).*
International Search Report dated Dec. 4, 2018 in International (PCT) Patent Application No. PCT/JP2018/035705.
Extended European Search Report dated May 20, 2021 in European Patent Application No. 18863330.9.
Zhong, Zhikai et al., "Blends of poly(vinyl chloride) with acrylonitrile-chlorinated polyethylene-styrene copolymer. I. Miscibility, phase behavior, and thermal properties", Journal of Macromolecular Science, Part B: Physics, 1997, vol. 36, No. 4, pp. 441-454.

* cited by examiner

*Primary Examiner* — Terressa Boykin
(74) *Attorney, Agent, or Firm* — Wenderoth, Lind & Ponack, L.L.P.

(57) ABSTRACT

The present invention provides a resin composition for molding that can provide a molded body having excellent heat resistance and excellent mechanical properties as well as high surface smoothness. The present invention also provides a molded body and a pipe each including the resin composition for molding. Provided is a resin composition for molding containing: a chlorinated polyvinyl chloride; a thermal stabilizer; and an impact resistance modifier, the chlorinated polyvinyl chloride having a chlorine content of 63 to 72% by mass, the thermal stabilizer containing a calcium-containing compound and a zinc-containing compound, the resin composition containing the thermal stabilizer in an amount of 0.4 to 10.0 parts by mass and the impact resistance modifier in an amount of 1.0 to 10.0 parts by mass relative to 100 parts by mass of the chlorinated polyvinyl chloride.

11 Claims, No Drawings

RESIN COMPOSITION FOR MOLDING

TECHNICAL FIELD

The present invention relates to a resin composition for molding that can provide a molded body having excellent heat resistance and excellent mechanical properties as well as high surface smoothness. The present invention also relates to a molded body and a pipe each including the resin composition for molding.

BACKGROUND ART

Polyvinyl chlorides (hereinafter referred to as PVCs) are materials excellent in mechanical strength, weather resistance, and chemical resistance, and have been used in various fields. PVCs, however, have poor heat resistance. This has led to the development of chlorinated polyvinyl chlorides (hereinafter referred to as CPVCs), which are PVCs chlorinated to have improved heat resistance. While PVCs cannot be used with hot water because they have low heat deformation temperature and a maximum usable temperature of around 60° C. to 70° C., CPVCs can be used with hot water because they have a heat deformation temperature higher than that of PCVs by as much as 20° C. to 40° C. For example, CPVCs are suitably used in heat-resistant pipes, heat-resistant joints, heat-resistant valves, heat-resistant plates, and the like.

Many CPVC heat-resistant pipes are used for supplying hot water. Since insufficient heat resistance leads to a large pipe deformation width during supply of hot water, and thus to damage and water leakage, higher heat resistance has been demanded.

To meet such a demand, for example, Patent Literature 1 proposes a heat-resistant polyvinyl chloride pipe which contains a chlorinated polyvinyl chloride having a chlorine content of 67.5% by weight or more and specific additives. The pipe achieves easy workability and easy adhesion, as well as heat resistance and hygiene.

As the degree of chlorination is increased, the heat resistance of the CPVC molded product is enhanced. However, such an increase in the degree of chlorination increases the viscosity compared to that of typical PVCs, leading to long stress relaxation time. As a result, the molded product has poor smoothness and great unevenness on the inner surface. These problems cause not only poor appearance but also easy stagnation of water and the like due to the influence of the surface irregularity, leading to bacteria growth or the like. CPVC molded products are thus difficult to use as pipes for supplying hot water or pipes for ultrapure water for plants.

Patent Literature 2 discloses a method for improving heat resistance by adding predetermined amounts of an organotin stabilizer, a lubricant, and the like to a CPVC having a high chlorine concentration.

This method still requires the use of a CPVC having a high chlorine content, and thus cannot solve the problem of a reduction in the moldability accompanying a reduction in the fluidity.

CITATION LIST

Patent Literature

Patent Literature 1: JP H04-359928 A
Patent Literature 2: WO 2009/058768

SUMMARY OF INVENTION

Technical Problem

The present invention aims to provide a resin composition for molding that can provide a molded body having excellent heat resistance and excellent mechanical properties as well as high surface smoothness. The present invention also aims to provide a molded body and a pipe each including the resin composition for molding.

Solution to Problem

The present invention relates to a resin composition for molding containing: a chlorinated polyvinyl chloride; a thermal stabilizer; and an impact resistance modifier, the chlorinated polyvinyl chloride having a chlorine content of 63 to 72% by mass, the thermal stabilizer containing a calcium-containing compound and a zinc-containing compound, the resin composition containing the thermal stabilizer in an amount of 0.4 to 10.0 parts by mass and the impact resistance modifier in an amount of 1.0 to 10.0 parts by mass relative to 100 parts by mass of the chlorinated polyvinyl chloride.

The present invention is described in detail below.

The inventors made intensive studies to find out that a molded body having excellent thermal stability, high impact resistance, and high surface smoothness can be produced by adding predetermined amounts of a thermal stabilizer containing a calcium-containing compound and a zinc-containing compound and an impact resistance modifier to a resin composition for molding containing a chlorinated polyvinyl chloride. The inventors thus completed the present invention.

In particular, in the present invention, excellent heat resistance can be achieved even with the use of a chlorinated polyvinyl chloride having a low chlorine content. Thus, use of the resin composition for molding in heat-resistant pipes can reduce damage due to deformation during supply of hot water.

The resin composition for molding of the present invention contains a chlorinated polyvinyl chloride (hereinafter also referred to as a "CPVC").

The CPVC has a chlorine content of 63 to 72% by mass.

A chlorine content of 63% by mass or more leads to sufficient heat resistance of the molded product. A chlorine content of 72% by mass or less leads to improved moldability. The chlorine content is preferably 66% by mass or more, and preferably 69% by mass or less.

The chlorine content of the CPVC can be measured in accordance with the method described in JIS K 7229.

The CPVC preferably has a gelling time of 100 to 200 seconds, more preferably 110 to 190 seconds.

When the gelling time is within the range, the collapse and fusion of the resin appropriately proceeds, so that the appearance and the physical properties can be enhanced in molding.

The gelling time means the time at which the motor torque reaches its maximum when a sample prepared by adding a thermal stabilizer, a lubricant, and an impact resistance modifier to the CPVC is put in Labo PlastoMill or the like and the rotor is rotated.

The CPVC preferably has a UV absorbance at a wavelength of 216 nm of 8.0 or less, more preferably 0.1 or more and 0.8 or less.

In an ultraviolet absorption spectrum, a wavelength of 216 nm is the wavelength at which —CH=CH—C(=O)— and —CH=CH—CH=CH—, which are heterogeneous structures in the CPVC, show absorption.

From the value of the UV absorbance of the CPVC, the heterogeneous structures in the molecular chain during the chlorination reaction can be quantified and thus used as an index of thermal stability. In the molecular structure of the CPVC, a chlorine atom attached to carbon adjacent to double-bonded carbon is unstable. Thus, dehydrochlorination occurs from this chlorine atom as the starting point. That is, the greater is the value of UV absorbance at the wavelength of 216 nm, the more readily dehydrochlorination will occur, which results in reduced thermal stability.

In particular, when the chlorine content of the CPVC is 63% by mass or more and less than 69% by mass, the value of the UV absorbance is preferably 0.8 or less. When the value of the UV absorbance exceeds 0.8, the influence of the heterogeneous structures in the molecular chain will be significant, which may result in low thermal stability.

When the chlorine content of the CPVC is 69% by mass or more and 72% by mass or less, the value of the UV absorbance is preferably 8.0 or less. When the value of the UV absorbance exceeds 8.0, the influence of the heterogeneous structures in the molecular chain will be significant, leading to low thermal stability.

In the CPVC, time required for the amount of dehydrochlorination at 190° C. to reach 7,000 ppm is preferably 60 seconds or longer, more preferably 100 seconds or longer.

The CPVC undergoes pyrolysis at high temperatures, and produces HCl gas during pyrolysis. Generally, as the degree of chlorination of the CPVC increases, the number of VC units decreases, and thus the amount of dehydrochlorination tends to decrease. As the degree of chlorination increases, however, a nonuniform chlorinated state or the amount of the heterogeneous structures increases, which reduces thermal stability. Thus, an increase in the nonuniform chlorinated state or the amount of the heterogeneous structures can be analyzed by measuring the amount of dehydrochlorination. For example, the time required for the amount of dehydrochlorination at 190° C. to reach 7,000 ppm can be used as an index of thermal stability. The shorter is the time, the lower will be the thermal stability.

In particular, when the chlorine content of the CPVC is 63% by mass or more and less than 69% by mass, the time required for the amount of dehydrochlorination at 190° C. to reach 7,000 ppm is preferably 60 seconds or longer. When the time is shorter than 60 seconds, thermal stability will be greatly impaired. Thus, the time is preferably 60 seconds or longer, more preferably 70 seconds or longer, still more preferably 80 seconds or longer.

When the chlorine content of the CPVC is 69% by mass or more and 72% by mass or less, the time is preferably 100 seconds or longer. When the time is shorter than 100 seconds, thermal stability will be significantly low. The time is therefore preferably 100 seconds or longer, more preferably 120 seconds or longer, still more preferably 140 seconds or longer.

The time required for the amount of dehydrochlorination at 190° C. to reach 7,000 ppm can be measured as follows. Initially, 1 g of the chlorinated polyvinyl chloride is placed in a test tube and heated at 190° C. in an oil bath. The produced HCl gas is then collected. The collected HCl gas is dissolved in 100 mL of ion-exchange water, and the pH is measured. The HCl concentration (ppm) (that is, the number of grams of HCl produced per million grams of the chlorinated polyvinyl chloride) is calculated based on the pH value. The time required for the HCl concentration to reach 7,000 ppm is then measured.

Preferably, the CPVC has structural units (a) to (c) represented by the following formulae (a) to (c), and the proportion of the structural unit (a) is 17.5 mol % or less, the proportion of the structural unit (b) is 46.0 mol % or more, and the proportion of the structural unit (c) is 37.0 mol % or less, relative to the total number of moles of the structural units (a), (b), and (c). Such a CPVC has high thermal stability and satisfactory molding processability.

[Chem. 1]

$$—CCl_2— \quad (a)$$

$$—CHCl— \quad (b)$$

$$—CH_2— \quad (c)$$

The molar ratios of the structural units (a), (b), and (c) in the CPVC reflect the site to which chlorine is introduced at the time of chlorination of the polyvinyl chloride (PVC). Ideally, the PVC prior to chlorination is substantially in a state where the proportion of the structural unit (a) is 0 mol %, the proportion of the structural unit (b) is 50.0 mol %, and the proportion of the structural unit (C) is 50.0 mol %. As chlorination proceeds, however, the proportion of the structural unit (c) decreases, while the proportions of the structural unit (b) and the structural unit (a) increase. At this time, nonuniformity of the chlorinated state will increase in a case where the proportion of the structural unit (a), which is unstable with a large steric hindrance, excessively increases, or in a case where the chlorinated site and the unchlorinated site are unevenly present within the same particle of the CPVC. When this nonuniformity increases, the thermal stability of the CPVC will be greatly impaired.

On the other hand, in the present invention, the molar ratios of the structural units (a), (b), and (c) in the CPVC are set within the above range, so that the CPVC has improved uniformity and satisfactory thermal stability.

In the present invention, the proportion of the structural unit (a) relative to the total number of moles of structural units (a), (b), and (c) is 17.5 mol % or less, preferably 16.0 mol % or less, and preferably 2.0 mol % or more.

The proportion of the structural unit (b) relative to the total number of moles of structural units (a), (b), and (c) is 46.0 mol % or more, preferably 53.5 mol % or more, and preferably 70.0 mol % or less.

The proportion of the structural unit (c) relative to the total number of moles of structural units (a), (b), and (c) is 37.0 mol % or less, preferably 30.5 mol % or less, and preferably 1.0 mol % or more.

In the present invention, it is particularly preferred that the proportion of the structural unit (b) be 58.0 mol % or more, and the proportion of the structural unit (c) be 35.8 mol % or less. With this structure, higher thermal stability can be achieved.

The molar ratios of the structural units (a), (b), and (c) in the CPVC can be measured by molecular structure analysis using NMR. NMR analysis can be performed in accordance with the method described in R. A. Komoroski, R. G. Parker, J. P. Shocker, Macromolecules, 1985, 18, 1257-1265.

A PVC portion not chlorinated in the molecular structure of the CPVC can be represented by a structural unit (d) shown in the following formula (d). This portion is herein referred to as a "VC unit".

In the CPVC used in the present invention, the amount of a sequence of four or more VC units in the molecular structure is preferably 30.0 mol % or less. As used herein, the "sequence of four or more VC units" means a portion consisting of four or more VC units joined in series.

[Chem. 2]

    (d)

A VC unit present in the CPVC is a starting point of dehydrochlorination, and the presence of continuous VC units tends to cause a continuous dehydrochlorination reaction called the "zipper reaction". That is, the greater is the number of a sequence of four or more VC units, the more readily dehydrochlorination will occur, which reduces thermal stability in the CPVC. Therefore, the proportion of a sequence of four or more VC units is preferably 30.0 mol % or less, more preferably 28.0 mol % or less. When the chlorine content of the CPVC is 69% by mass or more and less than 72% by mass, the proportion of a sequence of four or more VC units is preferably 18.0 mol % or less, more preferably 16.0 mol % or less.

The amount of a sequence of four or more vinyl chloride units in the molecular structure described above can be measured by molecular structure analysis using NMR described above.

The CPVC is a resin obtained by the chlorination of a polyvinyl chloride (PVC).

As the PVC, a vinyl chloride homopolymer, a copolymer of a vinyl chloride monomer and a monomer with unsaturated bond(s) that is copolymerizable with the vinyl chloride monomer, a graft copolymer obtained by graft copolymerization of a vinyl chloride monomer with a polymer, and the like can be used. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene.

Examples of the vinyl esters include vinyl acetate and vinyl propionate.

Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate.

Examples of the aromatic vinyls include styrene and α-methyl styrene.

Examples of the vinyl halides include vinylidene chloride and vinylidene fluoride.

Examples of the N-substituted maleimides include N-phenyl maleimide and N-cyclohexyl maleimide.

The polymer to which vinyl chloride is graft copolymerized is not limited as long as vinyl chloride can be graft copolymerized. Examples of the polymer include ethylene copolymers, acrylonitrile-butadiene copolymers, polyurethane, chlorinated polyethylene, and chlorinated polypropylene. These may be used singly or in combination of two or more.

Examples of the ethylene copolymers include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers.

While the PVC may have any average degree of polymerization, it is preferably 400 to 3,000, as commonly employed, more preferably 600 to 1,500. The average degree of polymerization can be measured using the method described in JIS K 6720-2: 1999.

The method of polymerizing the PVC is not limited, and a conventionally known method such as aqueous suspension polymerization, block polymerization, solution polymerization, or emulsion polymerization can be used.

The resin composition for molding of the present invention preferably has a CPVC content of 70 to 95% by mass. When the CPVC content is within this range, the molded body can have both heat resistance and impact resistance, as well as excellent surface smoothness.

The resin composition for molding of the present invention contains a thermal stabilizer containing a calcium-containing compound and a zinc-containing compound. The thermal stabilizer contains no heavy metal, and thus, a heavy-metal free resin composition for molding can be obtained.

When this thermal stabilizer is used, hydrochloric acid produced by the pyrolysis of the chlorinated polyvinyl chloride immediately reacts with the zinc compound to form zinc chloride. Further, the growth of polyenes produced by the elimination of hydrochloric acid from the chlorinated polyvinyl chloride is stopped through bonding with calcium alkyl carboxylate. As a result, coloring is suppressed.

The produced zinc chloride, which has the property of accelerating the pyrolysis of the chlorinated polyvinyl chloride, reacts with calcium alkyl carboxylate to produce calcium chloride and zinc alkyl carboxylate in the present invention. As a result, the thermal stabilizer has a significant synergistic effect in that it suppresses the pyrolysis-accelerating effect of zinc chloride, while utilizing the effect of the zinc compound of rapidly capturing hydrochloric acid.

The calcium-containing compound is preferably a calcium alkyl carboxylate.

Examples of the calcium alkyl carboxylate include calcium salts of pentanoic acid, hexanoic acid, heptanoic acid, octanoic acid, cyclohexylpropionic acid, nonanoic acid, decanoic acid, lauric acid, myristic acid, palmitic acid, stearic acid, 12-hydroxystearic acid, arachidic acid, behenic acid, lignoceric acid, and montanic acid.

Among the above, a calcium alkyl carboxylate with 8 to 28 carbon atoms is preferably used.

Examples of the zinc-containing compound include inorganic zinc compounds and organozinc compounds.

Examples of the inorganic zinc compounds include compounds including a carbonate, a chloride, a sulfate, an oxide, a hydroxide, a basic oxide, and a mixed oxide of zinc.

Examples of the organozinc compounds include alkyl zinc compounds such as di- and/or mono-alkyl zinc, zinc salts of organic aliphatic carboxylic acids, zinc salts of unsubstituted or substituted organic aromatic carboxylic acids, zinc organic phosphites, zinc salts of substituted or unsubstituted phenols, zinc salts of amino acids and derivatives thereof, and zinc salts of organic mercaptans.

Examples of organic aliphatic carboxylic acids forming the zinc salts of organic aliphatic carboxylic acids include montanic acid, rice bran fatty acids, behenic acid, erucic acid, stearic acid, oleic acid, linolic acid, rice fatty acids, ricinoleic acid, myristic acid, palmitic acid, lauric acid, lower fatty acids, octylic acid, isostearic acid, dimer acids, naphthenic acid, and acetic acid.

Examples of the organic aliphatic carboxylic acids also include dicarboxylic acids such as azelaic acid, sebacic acid, adipic acid, succinic acid, malonic acid, maleic acid, crotonic acid, malic acid, and tartaric acid, and monoesters thereof.

Examples of the organic aliphatic carboxylic acids also include citric acid and monoesters or diesters thereof, lactic acid, glycolic acid, thiodipropionic acid and monoesters thereof.

Examples of unsubstituted or substituted aromatic carboxylic acids forming the zinc salts of unsubstituted or substituted organic aromatic carboxylic acids include benzoic acid, o-, m- and p-toluylic acid, p-tert-butyl benzoic acid, p-hydroxybenzoic acid, salicylic acid, polybasic acids such as phthalic acid, meta-phthalic acid, terephthalic acid, and trimellitic acid, as well as monoesters or diesters thereof.

Examples of organic phosphites forming the zinc organic phosphites include acid phosphites, which are reaction products of fatty alcohols and phosphorus pentoxide. Specific examples of acid phosphites include butyl acid phosphite, octyl acid phosphite, stearyl acid phosphite, and behenyl acid phosphite.

Examples of substituted or unsubstituted phenols forming the zinc salts of substituted or unsubstituted phenols include phenols, cresols, xylol, octylphenol, nonylphenol, dinonylphenol, cyclohexylphenol, and phenylphenol. Examples of the substituted or unsubstituted phenols also include bisphenol A, bisphenol S, bisphenol F, esters of p-hydroxybenzoic acid, and esters of salicylic acid.

Examples of the amino acids and derivatives thereof include baked glutamic acid, glycine, and alanine.

Examples of organic mercaptans forming the zinc salts of organic mercaptans include lauryl mercaptan, thioglycolic acid and esters thereof, mercaptopropionic acid and esters thereof, thiomalic acid and monoesters or diesters thereof.

The thermal stabilizer, which contains a calcium-containing compound and a zinc-containing compound, is preferably a mixture of the calcium-containing compound and the zinc-containing compound.

The thermal stabilizer may be in the form of a powder or granular material, for example. The thermal stabilizer made into such a form can be used as a single-pack thermal stabilizer.

When the thermal stabilizer is in the form of a particulate material, the particle size can be adjusted as appropriate, depending on the purpose. Generally, the average particle size is preferably 50 μm to 5 mm, particularly preferably 70 μm to 2 mm.

The thermal stabilizer in the form of the granular material can be produced using a known granulation method, for example, extrusion granulation, spray granulation, rotating disk granulation, rolling granulation, or compression granulation.

The thermal stabilizer preferably has a loss in quantity on heating at 230° C. of less than 5% by mass.

When the loss in quantity on heating at 230° C. is 5% by mass or more, bubbles may be included inside the molded product to result in poor strength, or a streak-like pattern may be formed near the surface of the molded product to result in a defective appearance.

The loss in quantity on heating at 230° C. is more preferably less than 3% by mass.

The lower limit thereof is not limited, but is preferably 0.1% by mass.

The loss in quantity on heating at 230° C. can be measured using a thermogravimetric measurement (TG) apparatus.

The thermal stabilizer contains a calcium-containing compound and a zinc-containing compound. The mixing ratio of the calcium-containing compound to the zinc-containing compound (calcium-containing compound:zinc-containing compound) is preferably 9:1 to 4:6, more preferably 8:2 to 5:5.

The resin composition for molding of the present invention has a thermal stabilizer content of 0.4 to 10.0 parts by mass relative to 100 parts by mass of the chlorinated polyvinyl chloride. When the thermal stabilizer is contained within this range, the thermal stability can be more improved, and the molded body can maintain good appearance. The thermal stabilizer content is more preferably within the range of 0.4 to 6.0 parts by mass, still more preferably within the range of 0.5 to 3.0 parts by mass relative to 100 parts by mass of the chlorinated polyvinyl chloride.

In the resin composition for molding of the present invention, the amount of calcium derived from the thermal stabilizer is preferably 0.01 to 0.35% by mass, more preferably 0.02 to 0.30% by mass in the entire resin composition for molding. The above numerical range can be calculated from the amount of calcium contained in the thermal stabilizer.

In accordance with the present invention, a heavy metal-free resin composition for molding can be obtained.

As used herein, the term "heavy metal" refers to a metal with a high density, and generally, a metal with a density of 4 to 5 $g/cm^3$ or more. The term "heavy metal-free" means that the heavy metal content is 1,000 ppm or less. The heavy metal content is preferably 100 ppm or less.

Examples of such heavy metals include transition metals other than scandium, for example, Mn, Ni, Fe, Cr, Co, Cu, and Au. Such heavy metals also include metals of p-block elements in period 4 or less (e.g., Sn, Pb, and Bi), Cd, and Hg.

The resin composition for molding of the present invention preferably further contains an auxiliary stabilizer. When the auxiliary stabilizer is contained, thermal stability can be further improved.

A heavy metal-free auxiliary stabilizer can be used as the auxiliary stabilizer. Examples thereof include organic acid salts, epoxy compounds, phosphorous compounds, metal hydroxides, sodium adipate, glycidyl (meth)acrylate copolymers, oxetanyl compounds, vinyl ether compounds, and zeolite compounds.

Examples of the epoxy compounds include epoxidized soybean oil, epoxidized linseed oil, epoxidized tetrahydrophthalate, epoxidized polybutadiene, and bisphenol A-type epoxy compounds.

Examples of the phosphorous compounds include organophosphorous compounds, phosphites, and phosphates.

Examples of the metal hydroxides include calcium hydroxide and sodium hydroxide.

These auxiliary stabilizers may be used singly or in combinations of two or more. Note that the auxiliary stabilizer differs from the calcium alkyl carboxylate and the zinc compound.

Further, the auxiliary stabilizer preferably has a loss in quantity on heating at 200° C. of less than 5% by mass.

The resin composition for molding of the present invention contains an impact resistance modifier.

The impact resistance modifier is used to improve the impact resistance of the resulting molded body. The impact resistance modifier contains a rubber component.

Examples of the impact resistance modifier include: a copolymer of a (meth)acrylate monomer component and a rubber component; and a silicone acrylic rubber containing a (meth)acrylate monomer component and an organosiloxane monomer component.

Examples of the (meth)acrylate monomer component include alkyl (meth)acrylates containing 1 or more but 12 or less carbon atoms, such as methyl (meth)acrylate, ethyl (meth)acrylate, propyl (meth)acrylate, butyl (meth)acrylate, 2-ethyl (meth)acrylate, and 2-ethylhexyl methacrylate. These monomer components may be used singly or in combination of two or more (e.g., three).

The (meth)acrylate monomer component content of the polymer constituting the impact resistance modifier is not limited, and is preferably 20 to 40% by mass.

The rubber component may be a diene component or a non-diene component, and may be a homopolymer or a copolymer (including a bipolymer and a terpolymer). The copolymer may be any type of copolymer; the copolymer may be a random copolymer, an alternating copolymer, a block copolymer, or a graft copolymer.

Examples of the diene component include butadiene, isoprene, and chloroprene. Examples of the diene component also include copolymers containing a monomer component selected from the group consisting of a diene, an unsaturated nitrile, an α-olefin, and an aromatic vinyl. Specific examples include copolymers of an unsaturated nitrile and a diene (e.g., acrylonitrile-butadiene copolymer), copolymers of an aromatic vinyl and a diene (e.g., butadiene-styrene copolymer, styrene-isoprene copolymer), copolymers of an olefin and a diene (e.g., ethylene-propylene-diene copolymer).

The diene component content of the polymer constituting the impact resistance modifier is preferably 40 to 65% by mass.

Examples of the non-diene component include polymers containing one or two or more monomer components selected from the group consisting of an alkyl (meth)acrylate whose homopolymer has a second order transition temperature of lower than −20° C., an olefin, and an organosiloxane. Specific examples include acrylic rubbers, olefin rubbers (e.g., ethylene-propylene rubber) and silicone acrylic rubbers.

Examples of the alkyl (meth)acrylate whose homopolymer has a second order transition temperature of lower than −20° C. include alkyl (meth)acrylates and polar group-containing acrylates.

Examples of the alkyl (meth)acrylates include ethyl methacrylate, n-propyl methacrylate, isopropyl (meth)acrylate, n-butyl methacrylate, isobutyl methacrylate, sec-butyl methacrylate, t-butyl (meth)acrylate, and n-hexyl methacrylate. Cyclohexyl (meth)acrylate is also usable.

Examples of the polar group-containing acrylates include 2-hydroxyethyl (meth)acrylate, 2-hydroxypropyl (meth)acrylate, and 2-acryloyloxyethylphthalic acid.

More specifically, preferred impact resistance modifiers include methyl methacrylate-butadiene-styrene copolymers (MBS), acrylonitrile-butadiene-styrene copolymers (ABS), methyl methacrylate-acrylonitrile-butadiene-styrene copolymers (MABS), and methyl methacrylate-butadiene copolymers (MB).

Preferred impact resistance modifiers also include methyl methacrylate-acrylic/butadiene rubber copolymers, methyl methacrylate-acrylic/butadiene rubber-styrene copolymers, methyl methacrylate-acrylic rubber copolymers, and methyl methacrylate-(acrylic/silicone complex) copolymers. The impact resistance modifier preferably contains a methyl methacrylate-butadiene-styrene copolymer and/or an acrylonitrile-butadiene-styrene copolymer.

The resin composition for molding of the present invention has an impact resistance modifier content of 1.0 to 10.0 parts by mass relative to 100 parts by mass of the chlorinated polyvinyl chloride. The impact resistance modifier contained within the range can further improve the impact resistance of the resulting molded body.

The lower limit of the impact resistance modifier content is preferably 3.0 parts by mass and the upper limit thereof is preferably 8.0 parts by mass.

In the resin composition for molding of the present invention, the ratio of the impact resistance modifier to the thermal stabilizer (impact resistance modifier/thermal stabilizer) is preferably 10.0 or less, more preferably 0.6 to 10.0. When the ratio is within this range, the molded body can have both heat resistance and impact resistance, as well as excellent surface smoothness. The ratio is still more preferably 1.0 to 8.5.

The impact resistance modifier is preferably in a particle form with a small average particle size. The average particle size of the impact resistance modifier particles is preferably 0.1 to 200 μm.

The resin composition for molding of the present invention preferably further contains an antioxidant.

Examples of the antioxidant include phenolic antioxidants, phosphate antioxidants, sulfur antioxidants, and amine antioxidants. These antioxidants may be used singly or in combinations of two or more. Among the above, a phenolic antioxidant is preferred, and in particular, a hindered phenolic antioxidant is preferred.

Examples of the hindered phenolic antioxidant include 2,6-di-t-butyl-p-cresol, 2,6-diphenyl-4-octadecyloxyphenol, stearyl (3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5] undecane, and bis[β-(3-t-butyl-4-hydroxy-5-methylphenyl) propionate]. Among the above, 1,3,5-tris(3,5-di-t-butyl-4-hydroxybenzyl) isocyanurate, pentaerythrityl-tetrakis [methylene-3-(3,5-di-t-butyl-4-hydroxyphenyl)propionate], and the like are preferred. These hindered phenolic antioxidants can be used singly or in combinations of two or more.

The antioxidant preferably has a loss in quantity on heating at 200° C. of 0.1% by mass or more and less than 5% by mass.

When the loss in quantity on heating at 200° C. is 5% by mass or more, bubbles may be included inside the molded product to result in poor strength, or a streak-like pattern may be formed near the surface of the molded product to result in a defective appearance.

The loss in quantity on heating at 200° C. is more preferably 0.1% by mass or more and less than 3% by mass.

The resin composition for molding of the present invention preferably has an antioxidant content of 0.1 to 3 parts by mass, more preferably 0.2 to 2.5 parts by mass, relative to 100 parts by mass of the chlorinated polyvinyl chloride. When the antioxidant is contained within this range, a molded product with little coloration due to yellowing can be obtained.

The resin composition for molding of the present invention may be optionally mixed with additives such as lubricants, processing aids, heat resistance improvers, ultraviolet absorbents, light stabilizers, fillers, thermoplastic elastomers, and pigments.

Examples of the lubricants include internal lubricants and external lubricants. An internal lubricant is used to reduce the fluid viscosity of the molten resin during molding to prevent the generation of frictional heat. Examples of the internal lubricants include, but are not limited to, butyl stearate, lauryl alcohol, stearyl alcohol, glycerol monostearate, stearic acid, and bisamide. These internal lubricants may be used singly or in combinations of two or more.

The lubricant preferably has a loss in quantity on heating at 200° C. of 0.1% by mass or more and less than 5% by mass.

The external lubricant is used to improve the slip effect between metal surfaces and the molten resin during molding. Examples of the external lubricants include, but are not limited to, paraffin wax, polyolefin waxes such as polyethylene lubricants, ester waxes such as fatty acid ester lubricants, and montanic acid wax. These external lubricants may be used singly or in combinations of two or more.

Examples of the heat resistance improvers include, but are not limited to, α-methylstyrene resins and N-phenyl maleimide resins.

Examples of the light stabilizers include, but are not limited to, hindered amine light stabilizers.

The resin composition for molding of the present invention preferably has a lubricant content of 0.3 to 5.0 parts by mass relative to 100 parts by mass of the chlorinated polyvinyl chloride. When the lubricant content is contained within this range, a molded body having excellent surface smoothness can be obtained without scorching or foaming during molding.

The processing aid preferably contains an acrylic resin which has a weight average molecular weight of 900,000 to 5,000,000.

Examples of the acrylic resin include homopolymers of acrylic acid, methacrylic acid, and (meth)acrylates, and (meth)acrylic copolymers containing any of them.

Examples of the (meth)acrylates include methyl (meth) acrylate, ethyl (meth)acrylate, isopropyl (meth)acrylate, n-butyl (meth)acrylate, and isobutyl (meth)acrylate. Examples of the (meth)acrylates also include n-amyl (meth) acrylate, isoamyl (meth)acrylate, n-hexyl (meth)acrylate, 2-ethylhexyl (meth)acrylate, and n-octyl (meth)acrylate. The (meth)acrylic acid means acrylic acid or methacrylic acid. In the present invention, the processing aid is preferably a polymer of methyl (meth)acrylate (MMA).

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the pigments include, but are not limited to, organic pigments such as azo pigments, phthalocyanine pigments, threne pigments, and dye lake pigments; and inorganic pigments such as titanium dioxide and other oxide pigments, sulfide/selenide pigments, and ferrocyanide pigments.

A plasticizer may be added to the resin composition for molding of the present invention to improve processability during molding. The use of a large amount of plasticizer, however, is not so desirable because it may reduce the thermal stability of the molded body. Examples of the plasticizers include, but are not limited to, dibutyl phthalate, di-2-ethylhexyl phthalate, and di-2-ethylhexyl adipate.

A thermoplastic elastomer may be added to the resin composition for molding of the present invention to improve workability. Examples of the thermoplastic elastomers include, but are not limited to, nitrile thermoplastic elastomers, olefin thermoplastic elastomers, vinyl chloride thermoplastic elastomers, styrene thermoplastic elastomers, urethane thermoplastic elastomers, polyester thermoplastic elastomers, and polyamide thermoplastic elastomers.

Examples of the nitrile thermoplastic elastomers include acrylonitrile-butadiene copolymers (NBR).

Examples of the olefin thermoplastic elastomers include ethylene thermoplastic elastomers such as ethylene-vinyl acetate copolymers (EVA) and ethylene-vinyl acetate-carbon monoxide copolymers (EVACO).

Examples of the vinyl chloride thermoplastic elastomers include vinyl chloride-vinyl acetate copolymers and vinyl chloride-vinylidene chloride copolymers.

These thermoplastic elastomers may be used singly or in combinations of two or more.

The resin composition for molding of the present invention is preferably free from a β-diketone. A β-diketone is a component contained in conventional thermal stabilizers to improve thermal stability. When, however, a thermal stabilizer containing a β-diketone is used, the appearance of a molded body tends to be impaired in the production of the molded body by molding a resin composition by extrusion molding or injection molding. For example, streaks of a yellow to reddish brown color with a thickness of approximately 0.1 to 1 mm may be formed on the surface of the molded body, in parallel with the direction of flow of the resin. A molded body having such an impaired appearance is a defective product. In particular, the use of a die that has been used for long hours tends to produce such a defective product. In accordance with the present invention, however, a resin composition for molding having excellent thermal stability can be provided without using a thermal stabilizer containing a β-diketone.

The resin composition for molding of the present invention preferably has a heat deformation temperature (HDT) of 110° C. or higher and 120° C. or lower as measured in accordance with ASTM D648. With such a heat deformation temperature, heat shrinking can be reduced.

The resin composition for molding of the present invention preferably has a notched Izod impact strength at a notched portion of 266.9 J/m or higher and 800.7 J/m or lower. With such a notched Izod impact strength, a molded body having excellent impact resistance can be obtained.

The resin composition for molding of the present invention preferably has a cell class of at least 2-4-4-4-8 as defined in ASTM D1784. With such a cell class, a molded body having excellent heat resistance and excellent impact resistance can be obtained.

The resin composition for molding of the present invention may be produced using, for example, a method including the steps of: preparing a chlorinated polyvinyl chloride by preparing a suspension of a polyvinyl chloride in an aqueous medium in a reaction vessel, introducing chlorine into the reaction vessel, and chlorinating the polyvinyl chloride using any conventionally known method; and then adding predetermined amounts of a thermal stabilizer and an impact resistance modifier to the chlorinated polyvinyl chloride, followed by mixing.

In the step of preparing the chlorinated polyvinyl chloride, the reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, a dried PVC may be resuspended in an aqueous medium, or a suspension obtained by removing any substances undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from a cylinder.

While the gauge pressure in the reaction vessel is not limited, it is preferably from 0.3 to 2 MPa, because the higher is the chlorine pressure, the more readily the chlorine will penetrate into the PVC particles.

The method of chlorinating the PVC in the suspended state is not limited. Examples of chlorination methods include a method in which the excitation of bonding of the PVC and chlorine is brought about by thermal energy to accelerate the chlorination (hereinafter referred to as heat chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor walls is effective. The use of light energy such as ultraviolet light requires an apparatus capable of light energy irradiation such as ultraviolet irradiation under high temperature and high pressure conditions. In the case of photo-chlorination, the chlorination reaction temperature is preferably 40° C. to 80° C.

Preferred among the above chlorination method is a heat chlorination method involving no ultraviolet irradiation. Preferred is a method in which the excitation of bonding of the polyvinyl chloride and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 70° C. to 140° C. When the temperature is excessively low, the rate of chlorination will decrease. When the temperature is excessively high, dehydrochlorination reaction will occur along with the chlorination reaction, which causes coloration of the resulting CPVC. The heating temperature is more preferably 100° C. to 135° C. The heating method is not limited, and heating may be performed with an external jacket from the reaction vessel walls, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease. When hydrogen peroxide is added as described above, the rate of chlorination is improved, so that the heating temperature can be set relatively low. The heating temperature may be 65° C. to 110° C., for example.

During the chlorination, it is preferred to perform chlorination at a chlorine consumption rate of 0.010 to 0.015 kg/PVC-Kg·5 min after the chlorine content reaches a value that is five percentage points by mass lower than the final chlorine content, and further perform chlorination at a chlorine consumption rate of 0.005 to 0.010 kg/PVC-Kg·5 min after the chlorine content reaches a value that is three percentage points by mass lower than the final chlorine content. As used herein, the term "chlorine consumption rate" refers to the amount of chlorine consumed in 5 minutes per kilogram of the raw material PVC.

When chlorination is performed using the above-described method, a CPVC having less nonuniformity in the chlorinated state and having excellent thermal stability can be obtained.

The method of producing the resin composition for molding of the present invention includes the subsequent step of adding predetermined amounts of a predetermined thermal stabilizer and a predetermined impact resistance modifier and optionally an antioxidant to the chlorinated polyvinyl chloride, followed by mixing.

The method of mixing the antioxidant is not limited, and may be a method using hot blending or cold blending, for example.

In accordance with the structure of the present invention described above, a resin composition for molding having excellent thermal stability and free of heavy metals such as lead, cadmium, and tin can be provided.

Further, in accordance with another aspect of the present invention, a molded body molded from the resin composition for molding of the present invention is provided. Such a molded body is also encompassed by the present invention.

The molding method may be any conventionally known molding method, for example, extrusion molding or injection molding.

The molded body of the present invention is heavy metal-free, as with the resin composition for molding of the present invention, and thus, has the advantage of having no adverse effects on the environment, has excellent thermal stability, and has a satisfactory appearance. The molded body of the present invention can therefore be suitably used in applications such as building components, pipes and engineering plastics, and housing materials.

The pipe molded from the resin composition for molding of the present invention can be suitably used for hot water and cool water. Such a pipe is also encompassed by the present invention.

The molded body of the present invention preferably has a surface roughness (Rmax) at a surface of 0.1 μm or more and 2 μm or less.

The molded body of the present invention preferably has a filtered waviness center line average (WcA) at the surface of 0.1 μm or more and 2 μm or less, and a filtered waviness unevenness (Wct) of 1.0 μm or more and 10 μm or less.

The surface roughness (Rmax) can be measured by a method in accordance with JIS B 0601. The filtered waviness center line average (WcA) and the filtered waviness unevenness (Wct) can be measured by a method in accordance with JIS B 0610.

Advantageous Effects of Invention

The present invention can provide a resin composition for molding that can provide a molded body having excellent heat resistance and excellent mechanical properties as well as high surface smoothness. The present invention can also provide a molded body and a pipe each including the resin composition for molding.

DESCRIPTION OF EMBODIMENTS

The present invention will be hereinafter described in more detail with reference to examples; however, the invention should not be construed as being limited to these examples.

Example 1

(Preparation of Chlorinated Polyvinyl Chloride)

A glass-lined reaction vessel with an internal volume of 300 L was charged with 200 kg of ion-exchange water and 56 kg of a polyvinyl chloride with a degree of polymerization of 1,000. The mixture was stirred, and water was further added to the reaction vessel to disperse the mixture in the water. The pressure was subsequently reduced to remove oxygen from the reaction vessel, and the temperature was simultaneously elevated to 90° C.

Chlorine was then supplied into the reaction vessel so that the chlorine partial pressure would be 0.4 MPa, and the chlorination reaction was performed while adding 0.2% by mass hydrogen peroxide at a rate of 1 part by mass per hour (320 ppm/hour). The reaction was continued until the chlorine content of the chlorinated polyvinyl chloride reached 61% by mass. When the chlorine content of the chlorinated polyvinyl chloride reached 61% by mass (five percentage points by mass lower than the final chlorine content), the amount of 0.2% by mass hydrogen peroxide added was reduced to 0.1 parts by mass per hour (200 ppm/hour), and the average chlorine consumption rate was adjusted to 0.012 kg/PVC-kg·5 min, and then the chlorination was allowed to proceed. Further, when the chlorine content reached 63% by mass (three percentage points by mass lower than the final chlorine content), the amount of 0.2% by mass hydrogen peroxide added was reduced to 150 ppm/hour, and the average chlorine consumption rate was adjusted to 0.008 kg/PVC-kg·5 min, and then the chlorination was allowed to proceed. In this way, a chlorinated polyvinyl chloride having a chlorine content of 67.3% by mass was obtained. The chlorine content of the chlorinated polyvinyl chloride was measured in accordance with JIS K 7229.

The gelling time of the chlorinated polyvinyl chloride was measured by the following method.

(Gelling Time Measurement)

A compound sample was prepared by adding 1.2 parts by mass of a thermal stabilizer, 1.0 part by mass of a polyethylene lubricant, 0.5 parts by mass of a polyethylene oxide lubricant, and 5.5 parts by mass of an impact resistance modifier to 100 parts by mass of the chlorinated polyvinyl chloride. The thermal stabilizer, polyethylene lubricant, polyethylene oxide lubricant, impact resistance modifier used were as follows.

Thermal stabilizer (available from Nitto Kasei Co., Ltd., TVS #1380)

Polyethylene lubricant (available from Mitsui Chemicals, Inc., Hiwax 220MP)

Polyethylene oxide lubricant (available from Honeywell International Inc., A-C 316A)

Impact resistance modifier (available from Kaneka Corporation, Kane Ace M-511)

Subsequently, 59 g of the compound sample was put in Labo PlastoMill (available from Toyo Seiki Seisaku-Sho, Ltd., 4C150) at a temperature of 180° C. and pre-heated for 80 seconds. The rotor was then rotated at a frequency of 30 rpm. The time at which the motor torque reached its maximum was determined as the gelling time.

(Preparation of Chlorinated Polyvinyl Chloride Composition)

To 100 parts by mass of the obtained chlorinated polyvinyl chloride (degree of polymerization: 1,000) were added 1.5 parts by mass of calcium stearate and 1.0 part by mass zinc stearate as a thermal stabilizer and 6.0 parts by mass of MBS-1 resin as an impact resistance modifier. They were then mixed. The following MBS-1 resin was used.

MBS-1 (methyl methacrylate-butadiene-styrene copolymer) resin having a methyl methacrylate component content of 28% by mass, a diene component content of 52% by mass, and an average particle size of 0.1 μm Furthermore, 0.3 parts by mass of pentaerythrityl-tetrakis [3-(3,5-di-t-butyl-4-hydroxyphenyl) propionate] (hindered phenolic antioxidant, available from BASF, Irganox 1010) as an antioxidant was added and mixed.

Then, 1.0 part by mass of a polyethylene lubricant (available from Mitsui Chemicals, Inc., Hiwax 220MP), 0.5 parts by mass of an ester lubricant (available from Emery Oleochemicals Japan Ltd., LOXIOL G-15), and 3.0 parts by mass of titanium dioxide (available from Ishihara Sangyo Kaisha, Ltd., TIPAQUE CR-90) were added. They were uniformly mixed in a super mixer to give a chlorinated polyvinyl chloride composition.

(Preparation of Extrudate)

The obtained chlorinated polyvinyl chloride composition was fed into a twin-screw counter-rotating conical extruder with a diameter of 50 mm (Osada Seisakusho; "SLM-50") to prepare a pipe-shaped extrudate with an internal diameter of 20 mm and a thickness of 3 mm at a resin temperature of 209.0° C., a back pressure of 280.0 kg/cm$^2$, and an extrusion amount of 25.0 kg/hr.

Examples 2 to 21 and Comparative Examples 2 to 7

A chlorinated polyvinyl chloride composition and an extrudate were produced as in Example 1 except that the type and amount of the chlorinated polyvinyl chloride, thermal stabilizer, impact resistance modifier, and lubricant used were as shown in Table 1.

In Examples 7 and 8, ABS resin (acrylic component content: 34% by mass, diene component content: 53% by mass) was used instead of the MBS-1 resin.

In Examples 20 and 21, MBS-2 resin (methyl methacrylate component content: 25% by mass, diene component content: 60% by mass, average particle size: 0.1 μm) and MBS-3 resin (methyl methacrylate component content: 25% by mass, diene component content: 40% by mass, average particle size: 0.3 μm) were used instead of the MBS-1 resin.

In Example 15, an acrylic improver (methyl methacrylate-acrylic rubber copolymer, available from Mitsubishi Chemical Corporation, METABLEN W-450) was used.

In Example 16, a silicon improver (silicone acrylic rubber, available from Mitsubishi Chemical Corporation, METABLEN S-2001) was used.

Comparative Example 1

A chlorinated polyvinyl chloride composition and an extrudate were produced as in Example 1 except that 2.5 parts by mass of a tin thermal stabilizer (butyl tin mercaptide, available from Galata Chemicals, Mark 292) was used as the thermal stabilizer instead of 1.5 parts by mass of calcium stearate and 1.0 part by mass of zinc stearate.

<Evaluation>

The chlorinated polyvinyl chloride compositions and extrudates obtained in the examples and the comparative examples were evaluated as follows. Table 1 shows the results.

[Evaluation of Chlorinated Polyvinyl Chloride Composition]

<Mechanical properties (Izod impact strength, tensile strength, tensile modulus of elasticity, and thermal deformation temperature)>

The obtained chlorinated polyvinyl chloride composition was fed to two 8-inch rolls, and kneaded at 205° C. for 3 minutes to prepare 1.0-mm-thick sheets. The obtained sheets were layered, preheated with a press at 205° C. for 3 minutes, and then pressurized for 4 minutes to obtain a 3-mm-thick press plate. The obtained press plate was cut into specimens by machining. With these specimens, the Izod impact strength was measured in accordance with ASTM D256, and the tensile strength and tensile modulus of elasticity were measured in accordance with ASTM D638. The thermal deformation temperature was measured under a load of 186 N/cm$^2$ in accordance with ASTM D648. The thermal deformation temperature was measured after annealing the obtained press plate in a gear oven at 100° C. for 24 hours.

<Cell Class>

The cell class as defined in ASTM D1784 was determined.

[Evaluation of Molded Body]

<Surface Roughness>

The surface roughness (Rmax) was measured using a surface roughness measuring instrument (available from Tokyo Seimitsu Co., Ltd., SURFCOM 480A) by a method in accordance with JIS B 0601. The measurement was performed at an evaluation length of 0.3 mm, a measurement speed of 0.3 mm/sec, and a cut-off value of 0.08 mm.

<Filtered Waviness>

The filtered waviness center line average (filtered center line waviness, WcA) and the filtered waviness unevenness (Wct) of the outer surface were measured using a surface roughness measuring instrument (available from Tokyo Seimitsu Co., Ltd., SURFCOM 480A) by a method in accordance with JIS B 0601. The measurement was performed at an evaluation length of 30 mm, a measurement speed of 3 mm/sec, and a cut-off value of 0.25 to 8 mm.

TABLE 1

| | | | Examples | | | | | | |
|---|---|---|---|---|---|---|---|---|---|
| | | | 1 | 2 | 3 | 4 | 5 | 6 | 7 |
| Composition (parts by mass) | Chlorinated polyvinyl chloride (chlorine content: 67.3% by mass) | | 100 | 100 | 100 | — | — | 100 | 100 |
| | Chlorinated polyvinyl chloride (chlorine content: 64.0% by mass) | | — | — | — | 100 | — | — | — |
| | Chlorinated polyvinyl chloride (chlorine content: 70.0% by mass) | | — | — | — | — | 100 | — | — |
| | Chlorinated polyvinyl chloride (chlorine content: 72.0% by mass) | | — | — | — | — | — | — | — |
| | Chlorinated polyvinyl chloride (chlorine content: 62.0% by mass) | | — | — | — | — | — | — | — |
| | Chlorinated polyvinyl chloride gelling time (seconds) | | 127 | 127 | 127 | 110 | 166 | 127 | 127 |
| | Chlorinated polyvinyl chloride content in the entire composition | | 88.3% | 89.8% | 84.2% | 88.3% | 88.3% | 91.5% | 91.5% |
| | Thermal stabilizer | Calcium laurate | 1.5 | 0.4 | 4.5 | 1.5 | 1.5 | 1.5 | 1.5 |
| | | Calcium stearate | 1.0 | 0.2 | 3.5 | 1.0 | 1.0 | 1.0 | 1.0 |
| | | Calcium montanate | — | — | — | — | — | — | — |
| | | Zinc stearate | — | — | — | — | — | — | — |
| | | Zinc laurate | — | — | — | — | — | — | — |
| | | Tin thermal stabilizer | 2.5 | 0.6 | 8.0 | 2.5 | 2.5 | 2.5 | 2.5 |
| | Total thermal stabilizer content | | | | | | | | |
| | Proportion of Ca in the entire composition | | 0.09% | 0.02% | 0.25% | 0.09% | 0.09% | 0.09% | 0.09% |
| | Impact resistance modifier | MBS-1 | 6.0 | 6.0 | 6.0 | 6.0 | 6.0 | 2.0 | — |
| | | MBS-2 | — | — | — | — | — | — | — |
| | | MBS-3 | — | — | — | — | — | — | — |
| | | ABS | — | — | — | — | — | — | 2.0 |
| | | Acrylic Improver | — | — | — | — | — | — | — |
| | | Silicone Improver | — | — | — | — | — | — | — |
| | Mass ratio (impact resistance improver/thermal stabilizer) | | 2.4 | 10.0 | 0.8 | 2.4 | 2.4 | 0.8 | 0.8 |
| | Antioxidant | | 0.3 | 0.3 | 0.3 | 0.3 | 0.3 | 0.3 | 0.3 |
| | Polyethylene lubricant | | 1.0 | 1.0 | 1.0 | 1.0 | 1.0 | 1.0 | 1.0 |
| | Ester lubricant | | 0.5 | 0.5 | 0.5 | 0.5 | 0.5 | 0.5 | 0.5 |
| | Titanium oxide | | 3.0 | 3.0 | 3.0 | 3.0 | 3.0 | 3.0 | 3.0 |
| Evaluation (chlorinated | Izod impact strength (J/m) | | 529 | 510 | 520 | 490 | 505 | 250 | 140 |
| | Tensile strength (MPa) | | 51 | 52 | 48.9 | 45 | 57 | 53 | 52 |

TABLE 1-continued

| | | | 8 | 9 | 10 | 11 | 12 | 13 | 14 |
|---|---|---|---|---|---|---|---|---|---|
| | | | | | | | Examples | | |
| polyvinyl chloride composition) | Tensile modulus of elasticity (MPa) | | 2,580 | 2,740 | 2,490 | 2,490 | 2,840 | 2,630 | 2,650 |
| | Thermal deformation temperature (° C.) | | 115 | 116 | 114 | 111 | 118 | 116 | 116 |
| Evaluation (molded product) | Inner profile | Cell class | 24448 | 24448 | 24448 | 24348 | 24548 | 23448 | 23448 |
| | | Filtered center line waviness (WcA) | 1.09 | 1.22 | 1.27 | 0.94 | 0.89 | 1.54 | 1.85 |
| | | Filtered waviness unevenness (Wct) | 6.5 | 4.2 | 5.6 | 4.0 | 4.5 | 6.2 | 8.0 |
| | | Surface roughness (Rmax) | 0.61 | 0.77 | 0.69 | 0.51 | 1.88 | 0.87 | 0.94 |
| Composition (parts by mass) | Chlorinated polyvinyl chloride (chlorine content: 67.3% by mass) | | 100 | 100 | 100 | 100 | 100 | — | 100 |
| | Chlorinated polyvinyl chloride (chlorine content: 64.0% by mass) | | — | — | — | — | — | — | — |
| | Chlorinated polyvinyl chloride (chlorine content: 70.0% by mass) | | — | — | — | — | — | 100 | — |
| | Chlorinated polyvinyl chloride (chlorine content: 72.0% by mass) | | — | — | — | — | — | — | — |
| | Chlorinated polyvinyl chloride (chlorine content: 62.0% by mass) | | — | — | — | — | — | — | — |
| | Chlorinated polyvinyl chloride gelling time (seconds) | | 127 | 127 | 127 | 127 | 127 | 175 | 127 |
| | Chlorinated polyvinyl chloride content in the entire composition | | 86.7% | 86.7% | 88.3% | 88.3% | 88.3% | 88.3% | 86.8% |
| | Thermal stabilizer | Calcium laurate | 1.5 | 1.5 | 1.5 | — | 1.5 | 1.5 | 4.0 |
| | | Calcium stearate | — | — | — | 1.5 | — | — | — |
| | | Calcium montanate | — | — | — | 1.0 | — | — | — |
| | | Zinc stearate | 1.0 | 1.0 | 1.0 | — | 1.0 | 1.0 | 0.5 |
| | | Zinc laurate | — | — | — | — | — | — | — |
| | | Tin thermal stabilizer | — | — | — | — | — | — | — |
| | Total thermal stabilizer content | | 2.5 | 2.5 | 2.5 | 2.5 | 2.5 | 2.5 | 4.5 |
| | Proportion of Ca In the entire composition | | 0.09% | 0.09% | 0.12% | 0.06% | 0.09% | 0.09% | 0.23% |
| | Impact resistance modifier | MBS-1 | — | 8.0 | 6.0 | 6.0 | 6.0 | 6.0 | 6.0 |
| | | MBS-2 | — | — | — | — | — | — | — |
| | | MBS-3 | — | — | — | — | — | — | — |
| | | ABS | 8.0 | — | — | — | — | — | — |
| | | Acrylic Improver | — | — | — | — | — | — | — |
| | | Silicone Improver | — | — | — | — | — | — | — |
| | Mass ratio (impact resistance) | | 3.2 | 3.2 | 2.4 | 2.4 | 2.4 | 2.4 | 1.3 |

TABLE 1-continued

| | | | 15 | 16 | 17 | 18 | 19 | 20 | 21 |
|---|---|---|---|---|---|---|---|---|---|
| Composition (parts by mass) | | improver/thermal stabilizer | | | | | | | |
| | | Antioxidant | 0.3 | 0.3 | 0.3 | 0.3 | 0.3 | 0.3 | 0.2 |
| | | Polyethylene lubricant | 1.0 | 1.0 | 1.0 | 1.0 | 1.0 | 1.0 | 1.0 |
| | | Ester lubricant | 0.5 | 0.5 | 0.5 | 0.5 | 0.5 | 0.5 | 0.5 |
| | | Titanium oxide | 3.0 | 3.0 | 3.0 | 3.0 | 3.0 | 3.0 | 3.0 |
| Evaluation (chlorinated polyvinyl chloride composition) | Physical properties | Izod impact strength (J/m) | 300 | 730 | 482 | 543 | 520 | 390 | 300 |
| | | Tensile strength (MPa) | 48.5 | 48.8 | 51 | 51 | 51 | 53 | 51 |
| | | Tensile modulus of elasticity (MPa) | 2,500 | 2,500 | 2,550 | 2,530 | 2,520 | 2,630 | 2,520 |
| | | Thermal deformation temperature (° C.) | 114 | 113 | 115 | 115 | 115 | 116 | 115 |
| | | Cell class | 24448 | 25448 | 24448 | 25448 | 24448 | 24448 | 24448 |
| Evaluation (molded product) | Inner profile | Filtered center line waviness (WcA) | 1.96 | 1.00 | 1.23 | 1.55 | 1.43 | 1.98 | 1.17 |
| | | Filtered waviness unevenness (Wct) | 9.5 | 4.2 | 5.3 | 7.1 | 6.0 | 9.8 | 4.7 |
| | | Surface roughness (Rmax) | 1.02 | 0.99 | 1.59 | 1.64 | 1.48 | 1.94 | 0.65 |

| | | | Examples | | | | | | |
|---|---|---|---|---|---|---|---|---|---|
| | | | 15 | 16 | 17 | 18 | 19 | 20 | 21 |
| Composition (parts by mass) | Chlorinated polyvinyl chloride (chlorine content: 67.3% by mass) | | 100 | 100 | 100 | 100 | 100 | 100 | 100 |
| | Chlorinated polyvinyl chloride (chlorine content: 64.0% by mass) | | — | — | — | — | — | — | — |
| | Chlorinated polyvinyl chloride (chlorine content: 70.0% by mass) | | — | — | — | — | — | — | — |
| | Chlorinated polyvinyl chloride (chlorine content: 72.0% by mass) | | — | — | — | — | — | — | — |
| | Chlorinated polyvinyl chloride (chlorine content: 62.0% by mass) | | — | — | — | — | — | — | — |
| | Chlorinated polyvinyl chloride gelling time (seconds) | | 127 | 127 | 127 | 127 | 127 | 127 | 127 |
| | Chlorinated polyvinyl chloride content in the entire composition | | 88.3% | 88.3% | 86.7% | 87.0% | 86.5% | 93.2% | 93.2% |
| | Thermal stabilizer | Calcium laurate | 1.5 | 1.5 | 1.0 | 0.7 | 1.2 | 1.5 | 1.5 |
| | | Calcium stearate | — | — | — | — | — | — | — |
| | | Calcium montanate | 1.0 | 1.0 | 0.5 | 0.4 | 0.6 | 1.0 | 1.0 |
| | | Zinc stearate | — | — | — | — | — | — | — |
| | | Zinc laurate | — | — | — | — | — | — | — |
| | | Tin thermal stabilizer | — | — | — | — | — | — | — |
| | Total thermal stabilizer content | | 2.5 | 2.5 | 1.5 | 1.1 | 1.8 | 2.5 | 2.5 |

TABLE 1-continued

| | | | | | | | Comparative Examples | | | | | | |
|---|---|---|---|---|---|---|---|---|---|---|---|---|---|
| | | | | | | | | 1 | 2 | 3 | 4 | 5 | 6 | 7 |
| | Proportion of Ca In the entire composition | | 0.09% | 0.09% | 0.06% | 0.04% | 9.0% | — | 0.07% | 0.09% | 0.09% | | | |
| | Impact resistance modifier | MBS-1 | 6.0 | — | 9.0 | 9.0 | — | 9.0 | — | — | | | |
| | | MBS-2 | — | — | — | — | — | — | 6.0 | — | | | |
| | | MBS-3 | — | — | — | — | — | — | — | 6.0 | | | |
| | | ABS | — | — | — | — | — | — | — | — | | | |
| | | Acrylic Improver | — | 6.0 | — | — | — | — | — | — | | | |
| | | Silicone Improver | — | — | — | — | — | — | — | — | | | |
| | Mass ratio (impact resistance improver/thermal stabilizer) | | 2.4 | 2.4 | 6.0 | 8.2 | — | 5.0 | 2.4 | 2.4 | | | |
| | Antioxidant | | 0.3 | 0.3 | 0.3 | 0.3 | — | 0.3 | 0.3 | 0.3 | | | |
| | Polyethylene lubricant | | 1.0 | 1.0 | 1.0 | 1.0 | — | 1.0 | 1.0 | 1.0 | | | |
| | Ester lubricant | | 0.5 | 0.5 | 0.5 | 0.5 | — | 0.5 | 0.5 | 0.5 | | | |
| | Titanium oxide | | 3.0 | 3.0 | 3.0 | 3.0 | — | 3.0 | 3.0 | 3.0 | | | |
| Evaluation (chlorinated polyvinyl chloride composition) | Physical properties | Izod impact strength (J/m) | 410 | 300 | 690 | 720 | — | 760 | 529 | 529 | | | |
| | | Tensile strength (MPa) | 51 | 50 | 49 | 49 | — | 49 | 51 | 51 | | | |
| | | Tensile modulus of elasticity (MPa) | 2,580 | 2,580 | 2,500 | 2,490 | — | 2,510 | 2,580 | 2,580 | | | |
| | | Thermal deformation temperature (° C.) | 114 | 113 | 111 | 110 | — | 111 | 115 | 115 | | | |
| Evaluation (molded product) | Inner profile | Cell class | 24448 | 24448 | 24448 | 24448 | — | 24448 | 24448 | 24448 | | | |
| | | Filtered center line waviness (WcA) | 1.5 | 1.3 | 1.28 | 1.13 | — | 1.42 | 1.09 | 1.09 | | | |
| | | Filtered waviness unevenness (Wct) | 6.3 | 5.8 | 5.8 | 4.8 | — | 5.9 | 6.5 | 6.5 | | | |
| | | Surface roughness (Rmax) | 0.7 | 0.83 | 1.02 | 0.96 | — | 1.15 | 0.61 | 0.61 | | | |

| | | Comparative Examples | | | | | | |
|---|---|---|---|---|---|---|---|---|
| | | 1 | 2 | 3 | 4 | 5 | 6 | 7 |
| Composition (parts by mass) | Chlorinated polyvinyl chloride (chlorine content: 67.3% by mass) | 100 | 100 | 100 | — | — | 100 | 100 |
| | Chlorinated polyvinyl chloride (chlorine content: 64.0% by mass) | — | — | — | — | 100 | — | — |
| | Chlorinated polyvinyl chloride (chlorine content: 70.0% by mass) | — | — | — | — | — | — | — |
| | Chlorinated polyvinyl chloride (chlorine content: 72.0% by mass) | — | — | — | — | — | — | — |
| | Chlorinated polyvinyl chloride (chlorine content: 62.0% by mass) | — | — | — | 100 | — | — | — |
| | Chlorinated polyvinyl chloride gelling time (seconds) | 127 | 127 | 127 | 103 | 127 | 127 | 127 |
| | Chlorinated polyvinyl chloride content in | 88.3% | 90.1% | 82.1% | 88.3% | 92.8% | 83.8% | 84.9% |

TABLE 1-continued

| | | | | | | | | |
|---|---|---|---|---|---|---|---|---|
| the entire composition | | | | | | | | |
| Thermal stabilizer | Calcium laurate | — | — | — | — | — | — | — |
| | Calcium stearate | — | — | 6.0 | 1.5 | 1.5 | 1.5 | — |
| | Calcium montanate | — | 0.1 | — | — | — | — | — |
| | Zinc stearate | — | — | 5.0 | 1.0 | 1.0 | 1.0 | 0.7 |
| | Zinc laurate | — | — | — | — | — | — | — |
| | Tin thermal stabilizer | 2.5 | 0.1 | — | — | — | — | 0.3 |
| Total thermal stabilizer content | | 2.5 | 0.2 | 11.0 | 2.5 | 2.5 | 2.5 | 1.0 |
| Proportion of Ca in the entire composition | | — | 0.01% | 0.33% | 0.09% | 0.09% | 0.08% | 0.04% |
| Impact resistance modifier | MBS-1 | 6.0 | 6.0 | 6.0 | 6.0 | — | 1.2 | 12.0 |
| | MBS-2 | — | — | — | — | 0.5 | — | — |
| | MBS-3 | — | — | — | — | — | — | — |
| | ABS | — | — | — | — | — | — | — |
| | Acrylic Improver | — | — | — | — | — | — | — |
| | Silicone Improver | — | — | — | — | — | — | — |
| Mass ratio (impact resistance improver/thermal stabilizer) | | 2.4 | 30.0 | 0.5 | 2.4 | 0.2 | 4.8 | 12.0 |
| Antioxidant | | 0.3 | 0.3 | 0.3 | 0.3 | 0.3 | 0.3 | 0.3 |
| Polyethylene lubricant | | 1.0 | 1.0 | 1.0 | 1.0 | 1.0 | 1.0 | 1.0 |
| Ester lubricant | | 0.5 | 0.5 | 0.5 | 0.5 | 0.5 | 0.5 | 0.5 |
| Titanium oxide | | 3.0 | 3.0 | 3.0 | 3.0 | 3.0 | 3.0 | 3.0 |
| Evaluation (chlorinated polyvinyl chloride composition) Physical properties | Izod impact strength (J/m) | 530 | 581 | 420 | 530 | 140 | 840 | 850 |
| | Tensile strength (MPa) | 49 | 53 | 48 | 42 | 54 | 45 | 45 |
| | Tensile modulus of elasticity (MPa) | 2,490 | 2,670 | 2,550 | 2,280 | 2,680 | 2,330 | 2,300 |
| | Thermal deformation temperature (° C.) | 108 | 117 | 112 | 108 | 116 | 113 | 113 |
| | Cell class | 24447 | 25448 | 24448 | 24337 | 23448 | 25338 | 25338 |
| Evaluation (molded product) Inner profile | Filtered center line waviness (WcA) | 0.35 | 5.81 | 3.49 | 0.56 | 1.27 | 2.48 | 2.32 |
| | Filtered waviness unevenness (Wct) | 3.2 | 13.3 | 12.9 | 3.7 | 5.6 | 13.5 | 11.4 |
| | Surface roughness (Rmax) | 0.49 | 2.8 | 1.95 | 0.44 | 3.5 | 1.81 | 2.55 |

INDUSTRIAL APPLICABILITY

The present invention can provide a resin composition for molding that can provide a molded body having excellent heat resistance and excellent mechanical properties as well as high surface smoothness. The present invention can also provide a molded body and a pipe each including the resin composition for molding.

The invention claimed is:

1. A resin composition for molding comprising:
   a chlorinated polyvinyl chloride;
   a thermal stabilizer; and
   an impact resistance modifier,
   the chlorinated polyvinyl chloride having a chlorine content of 63 to 72% by mass,
   the thermal stabilizer comprising a calcium-containing compound and a zinc-containing compound,
   the impact resistance modifier being in a particle form and having an average particle size of 0.1 to 200 μm, and
   the resin composition comprising the thermal stabilizer in an amount of 0.4 to 10.0 parts by mass and the impact resistance modifier in an amount of 1.0 to 10.0 parts by mass relative to 100 parts by mass of the chlorinated polyvinyl chloride.

2. The resin composition for molding according to claim 1,
   wherein the chlorinated polyvinyl chloride has structural units (a) to (c) represented by the following formulae (a) to (c):

—CCl$_2$-                                                      (a),

—CHCl-                                                      (b),

—CH$_2$-                                                        (c), wherein the proportion of the structural unit (a) is 17.5 mol % or less, the proportion of the structural unit (b) is 46.0 mol % or more, and the proportion of the structural unit (c) is 37.0 mol % or less, relative to the total number of moles of the structural units (a), (b), and (c).

3. The resin composition for molding according to claim 1,
   comprising the chlorinated polyvinyl chloride in an amount of 70% by mass or more.

4. The resin composition for molding according to claim 1,
   wherein the impact resistance modifier comprises a methyl methacrylate-butadiene-styrene copolymer and/or an acrylonitrile-butadiene-styrene copolymer.

5. The resin composition for molding according to claim 1,
   which is free from β-diketone.

6. The resin composition for molding according to claim 1,
   having a heat deformation temperature (HDT) of 110° C. or higher as measured in accordance with ASTM D648.

7. The resin composition for molding according to claim 1,
   having a cell class of at least 2-4-4-4-8 as defined in ASTM D1784.

8. The resin composition for molding according to claim 1,
   having a notched Izod impact strength at a notched portion of 266.9 J/m or higher.

9. A molded body molded from the resin composition for molding according to claim 1.

10. A pipe molded from the resin composition for molding according to claim 1.

11. The pipe according to claim 10,
    which is used for hot water and cool water.

* * * * *